(12) United States Patent
Kinoshita

(10) Patent No.: US 7,567,754 B2
(45) Date of Patent: Jul. 28, 2009

(54) FLUID OPERATED LENS-POSITION CONTROLLER AND IMAGING MODULE

(75) Inventor: Kazuo Kinoshita, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 279 days.

(21) Appl. No.: 11/385,548

(22) Filed: Mar. 20, 2006

(65) Prior Publication Data

US 2006/0215053 A1    Sep. 28, 2006

(30) Foreign Application Priority Data

Mar. 22, 2005    (JP) ............................. 2005-082532

(51) Int. Cl.
  *G03B 13/18*    (2006.01)
  *G02B 1/06*    (2006.01)
(52) U.S. Cl. ........................ 396/89; 396/72; 348/345; 359/665
(58) Field of Classification Search ............... 396/72, 396/89, 111; 348/240.3, 335, 345; 359/228, 359/665, 667, 666
  See application file for complete search history.

(56) References Cited

U.S. PATENT DOCUMENTS

| | | | |
|---|---|---|---|
| 4,907,021 A | 3/1990 | Yabu | |
| 5,826,118 A | 10/1998 | Koga et al. | |
| 6,646,713 B2 * | 11/2003 | Ishii | ............. 355/30 |
| 6,686,989 B2 * | 2/2004 | Hagiwara et al. | ............. 355/30 |
| 6,747,813 B2 | 6/2004 | Wakai et al. | |
| 7,019,919 B2 | 3/2006 | Wakai et al. | |

FOREIGN PATENT DOCUMENTS

| | | |
|---|---|---|
| DE | 197 33 628 A1 | 2/1999 |
| EP | 1 600 100 A1 | 11/2005 |
| JP | 48 090538 A | 11/1973 |
| JP | 55052009 | 4/1980 |
| JP | 58-086512 | 5/1983 |
| JP | 06-011637 | 1/1994 |
| JP | 08046840 | 2/1996 |
| JP | 09-197260 | 7/1997 |
| JP | 09-230189 | 9/1997 |
| JP | 09-230215 | 9/1997 |

(Continued)

OTHER PUBLICATIONS

Extended European Search Repor for Appln. No. 06251490.6-2217.

*Primary Examiner*—Jay M Patidar
(74) *Attorney, Agent, or Firm*—Edwards Angell Palmer & Dodge LLP; David G. Conlin; David A. Tucker

(57) ABSTRACT

A lens holder for supporting a lens is put so as to slide on a side surface of a lens barrel in which an image sensor having a light receiving portion is arranged at the bottom, and the lens barrel and the lens holder are connected together by a connecting material. A fluid is filled in a space formed by the container composed of the substrate and the lens barrel, and the lens holder, and then a position of the lens with respect to the light receiving portion is controlled by controlling a volume of the fluid in the space to thereby move a position of the lens holder with respect to the lens barrel. Positioning of the lens is easily performed even when it is a compact configuration.

9 Claims, 15 Drawing Sheets

| | FOREIGN PATENT DOCUMENTS | |
|---|---|---|
| JP | 2003-029115 | 1/2003 |
| JP | 2003-191874 A | 6/2003 |
| JP | 2004/03468 | 3/2004 |
| JP | 2004/03480 | 3/2004 |
| JP | 2004-153555 | 5/2004 |
| JP | 2004-251999 | 9/2004 |
| JP | 1221207 | 9/2004 |
| JP | 2004-280031 | 10/2004 |
| TW | 2004/03468 | 3/2004 |
| TW | 2004/03480 | 3/2004 |
| TW | 1221207 | 9/2004 |

\* cited by examiner

F I G. 9
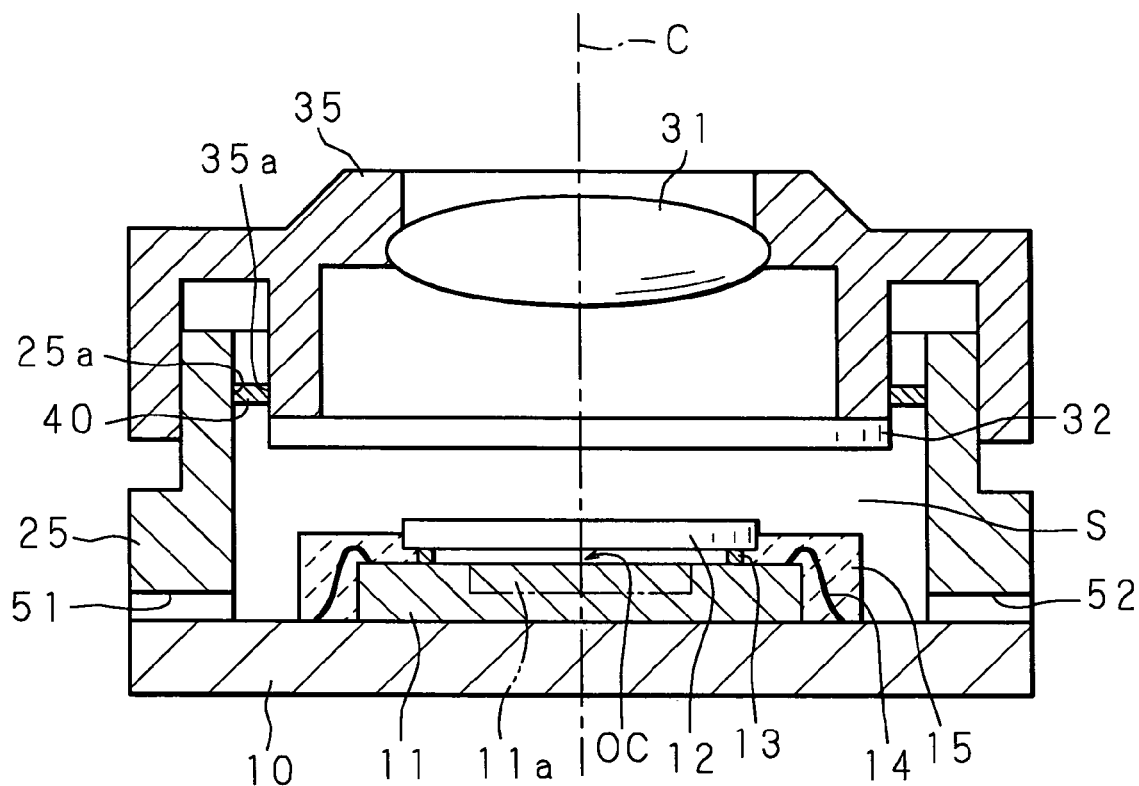

FLUID OPERATED LENS-POSITION CONTROLLER AND IMAGING MODULE

CROSS-REFERENCE TO RELATED APPLICATIONS

This Nonprovisional application claims priority under 35 U.S.C. § 119(a) on Patent Application No. 2005-82532 filed in Japan on Mar. 22, 2005, the entire contents of which are hereby incorporated by reference.

BACKGROUND OF THE INVENTION

The present invention relates to a lens-position controller and an imaging module, and relates more specifically to an imaging module in which an image sensor having a light receiving portion, and a lens for imaging an incident light in the light receiving portion are modularized (integrated), and a lens-position controller for controlling a position of the lens with respect to the light receiving portion in the imaging module.

An image sensor, such as a CCD, a CMOS imager, or the like, which is a kind of a semi-conductor, is used in various fields. Particularly, a camera mobile phone to which camera functions are added, in addition to communication functions, by incorporating the image sensor is widely put into practical use. With a reduction in size, thickness, and weight of a product itself, such as a camera mobile phone, a digital camera, or the like, an imaging module in which an image sensor and a lens are modularized has come into practical use.

In a recent imaging module, an imaging module incorporating an automatic focusing adjustment (autofocus) mechanism capable of providing clear images by moving a position of a lens to thereby automatically adjust an optical path length of the lens into a focal distance, has come into practical use. Utilizing such an autofocus mechanism makes it possible to dynamically change the focal distance according to a distance of a subject to thereby address broad requests even when the lens itself does not have a high performance.

Meanwhile, when a lens and a lens barrel are manufactured, there may arise a focus gap resulting from respective manufacturing variabilities, but incorporating the autofocus mechanism can eliminate the need of adjusting a focus at the time of factory shipment, so that the autofocus mechanism results in very effective means also for manufacturers.

Incidentally, a conventional autofocus mechanism mainly employs a mechanical drive system, and a present situation is that the structure becomes complicated and the weight is increased. Meanwhile, in recent years, artistic aspects, such as a color tone of the image, clearness of the image due to a depth of field, or the like, have become important, and for this reason, a mechanism in which a number of lenses are combined has come into practical use. In this case, focal distances of respective lenses have needed to be adjusted, thus resulting in further contributing to an increase in structure and weight of the mechanism.

In Japanese Patent Application Laid-Open No. 2004-251999, there is disclosed an AF drive mechanism of a camera provided with a motor, at least a part the motor being arranged at the bottom in a camera body, and a rotatable shaft of the motor being positioned in a direction perpendicular to an optical axis of a lens barrel which is provided in the camera body, a worm-gear integrally formed in the rotatable shaft, a first cylindrical material in which a wheel gear engaging with the worm-gear is formed in an outer peripheral surface, an AF coupler having a joint portion with the lens barrel, a second cylindrical material for supporting the AF coupler, a connecting material for connecting between the first cylindrical material and the second cylindrical material, wherein the AF drive mechanism is arranged in a space formed with a part of a circular edge portion of a lens mount in which the lens barrel is provided, and a tangent of a point closest to the bottom of the camera body in the edge portion of the lens mount.

In Japanese Patent Application Laid-Open No. 2004-280031, there is disclosed a lens driving device provided with a cylindrical yoke with U shape, a magnet attached to an inner surface of an outside wall of the yoke, a carrier having a lens in the center, a coil mounted on the carrier, a base equipped with the yoke, a frame for supporting the base, two springs for supporting the carrier, wherein the two springs being the same part are arranged so as to support both sides of the carrier from the upper and lower sides, and each of the springs is operated as a power feeding path to the coil, so that a moving distance of the lens that is mounted on the carrier is controlled by a balance between a current value applied to the coil and stability of the two springs.

In Japanese Patent Application Laid-Open No. S58-86512 (1983), there is disclosed a focusing mechanism provided with a cylinder room arranged along an axial direction at an end point of an endoscope, and openings of both ends of the cylinder room being hermetically sealed with a transparent material, a lens frame movably hermetically fitted in the cylinder room in the axial direction while holding at least a part of the objective lens system, and supply-and-exhaustion paths respectively arranged in two rooms of the cylinder room which are divided by the lens frame, wherein the lens frame is moved by supplying and draining a transparent fluid to and from the two rooms via the supply-and-exhaustion paths to thereby perform focusing.

BRIEF SUMMARY OF THE INVENTION

In the technology disclosed in Japanese Patent Application Laid-Open No. 2004-251999, however, there is a problem of an increase in the weight because of an increase in parts required and complication in structure. This is because that a lens position is adjusted by a machine control with the motor, so that the problem cannot be avoided as long as the machine control is performed. In the imaging devices, such as a digital still camera, a digital movie, or the like, which are excellent in portability, it is possible to correct defocus or the like, which has been produced in shooting, by performing image processing after shooting, but the correction is limited, and in addition to that, there arises a problem that image quality will be deteriorated after the correction. Moreover, moving portions inside the camera have been worn out due to their rubbings in focusing, and microscopic dusts have then adhered to a light receiving portion of an image sensor, so that there has been a problem that shadows of the dusts have been reflected to the image as spots or black scratches.

In the technology disclosed in Japanese Patent Application Laid-Open No. 2004-280031, a magnetic leakage cannot be ignored because of the use a powerful magnetic part, namely, a permanent magnet or an electromagnet. When a camera (for example, a camera module of a mobile phone, a digital still camera) that incorporates this technology is brought close to magnetic storage media, such as a hard disk, a flexible disk, and a prepaid card, there is a possibility of destroying information stored in the magnetic storage media. Additionally, there is a possibility that the respective magnets may mutually interact, or attract other metallic parts during assembly and transportation, so that this technology is not preferable from the viewpoint of manufacturing.

In the technology disclosed in Japanese Patent Application Laid-Open No. S58-086512(1983), it is difficult to achieve a reduction in size because of a mechanism, in which the cylinder room is divided into the two rooms (a front room and a rear room) to move the lens frame. Moreover, it is required to control a pressure difference between the pressures of the fluid in the two rooms, thus resulting in the necessity of a very complicated control.

The present invention has been made in view of the situation described above, and aims at providing a lens-position controller which can control a position of a lens in an optical axis direction, even if the control is extremely simple and the size is small, by providing a lens support material for supporting the lens while covering a container to thereby control the amount of fluid introduced to a space which is formed by the container and the lens support material.

Further, the present invention aims at providing a lens-position controller which can control a position of a lens in an optical axis direction even if the control is extremely simple and the size is small, by putting a lens support material for supporting the lens so as to slide on a side surface of a cylindrical container, and filling a fluid in a space formed by connecting the container and the lens support material with a connecting material over a circumference of the side surface to thereby control a volume in the space.

Still further, the present invention aims at providing a lens-position controller which is extremely simple and small in size, and capable of adjusting a focal point and/or a magnification by controlling a position of a lens to adjust the focal point and/or the magnification.

Still further, the present invention aims at providing an imaging module which can move a position of a lens support material with respect to a container to thereby control the position of the lens with respect to a light receiving portion, even if the control is extremely simple and the size is small by putting the lens support material for supporting the lens so as to slide on the side surface of the cylindrical container in which the image sensor having the light receiving portion is arranged at the bottom, and filling a fluid in a space formed by connecting the container and the lens support material with a connecting material over the perimeter of the side surface to thereby control a volume in the space.

Still further, the present invention aims at providing an imaging module, by varying the volume of the fluid in the space according to the expansion and contraction of the connecting material, when the fluid flows into the space, the connecting material expands, and the volume of the fluid filled in the space is increased, so that a distance of the lens with respect to the light receiving portion can be made longer than a reference value, whereas, when the fluid flows out of the space, the connecting material contracts and further expands to a reverse direction, and the volume of the fluid filled in the space is decreased, so that the distance of the lens with respect to the light receiving portion can be made shorter than the reference value.

Still further, the present invention aims at providing an imaging module, wherein by employing a configuration provided with a position regulating section for regulating a moving range of the lens in an optical axis direction, an elastic range of the connecting material is limited even when a connecting material having elasticity is used, so that the breaking can be prevented, resulting in preventing a leak of the fluid to the outside due to the breaking of the connecting material.

Still further, the present invention aims at providing an imaging module which can easily control the volume of the fluid in the space by providing a plurality of openings for allowing the fluid to flow in and/or out of the space, and by controlling the volume of the fluid in the space through the openings to thereby control the volume of the fluid in the space according to the amount of the fluid flowing in and out of the plurality of openings.

Still further, the present invention aims at providing an imaging module which can control a position of the lens with respect to the light receiving portion by connecting compressing and decompressing means for compressing and decompressing the fluid to the openings, and compressing and decompressing the fluid to thereby control the fluid flowing in and out through the openings.

Still further, the present invention aims at providing an imaging module capable of circulating the fluid inside and outside the module by regulating a direction of the fluid flowing in and out of the space through each opening by a check valve to thereby give regulation to the direction of the fluid flowing in and out.

Still further, the present invention aims at providing an imaging module capable of preventing foreign materials, such as a dust or the like, from flowing into the space again by removing an unnecessary substance existing in the space with the circulation of the fluid and a filter.

Still further, the present invention aims at providing an imaging module capable of keeping a temperature inside the imaging module constant by the circulation of the fluid.

Still further, the present invention aims at providing an imaging module having an extremely simple and compact focal point adjustment function and/or magnification adjustment function by controlling the position of the lens to adjust the focal point and/or the magnification.

A lens-position controller in accordance with the present invention is provided with a container, a lens support material for supporting a lens while covering the container, the lens support material being able to move along an optical axis direction of the lens, a fluid for mediating movement of the lens support material, and control means for controlling the amount of fluid introduced to a space which is formed by the container and the lens support material, wherein a position of the lens in the optical axis direction is controlled by controlling the amount of fluid introduced to the space.

According to the present invention, the lens support material for supporting the lens while covering the container is provided, and the amount of fluid introduced to the space which is formed by the container and the lens support material is controlled, so that the position of the lens in the optical axis direction is controlled by moving the position of the lens support material with respect to the container. As described above, since the position of the lens can be controlled by the amount of fluid introduced to one space, the control is extremely simple and a reduction in size can be easily achieved. Moreover, since movement of the lens is smooth and quiet because of using the fluid, when, for example, a microphone for collecting a voice is provided in the neighborhood, a noise during the lens movement may not be collected by the microphone, so that it is applicable to various applications.

A lens-position controller in accordance with the present invention is provided with a container whose side surface is cylindrical in shape, a lens support material for supporting a lens, the lens support material being put so as to slide on the side surface of the container, a connecting material for connecting between the container and the lens support material over a circumference of the side surface thereof, a fluid which is filled in a space formed by the container and the lens support material, and control means for controlling a volume of the fluid in the space, wherein a position of the lens in an optical axis direction is controlled by controlling the amount of fluid.

According to the present invention, the lens support material for supporting the lens is put so as to slide on the side surface of the cylindrical container, and the container and the lens support material are connected by the connecting material over the circumference of the side surface thereof. The fluid is then filled in the space which is formed by the container and the lens support material, and the position of the lens support material with respect to the container is moved by controlling the volume of the fluid in the space, so that the position of the lens in the optical axis direction is controlled. As described above, since the position of the lens can be controlled by the volume of the fluid in one space formed by the container and the lens support material, the control is extremely simple and a reduction in size can be easily achieved.

The lens-position controller in accordance with the present invention is configured in such a way that a focal point and/or or a magnification thereof may be adjusted by controlling the position of the lens.

According to the present invention, the position of the lens is controlled to adjust the focal point and/or or the magnification, thus, making it is possible to provide the lens-position controller which is extremely simple and small in size, and capable of adjusting the focal point and/or or the magnification thereof. As a result, even when a plurality of lenses are combined and the position of each lens is controlled, the mechanism is simple, so that it is possible to prevent the apparatus itself from increasing the weight.

An imaging module in accordance with the present invention is provided with an image sensor having a light receiving portion, and a lens, and the imaging module which guides a light entered into the lens to the light receiving portion is provided with a container whose side surface is cylindrical in shape, the image sensor being arranged at the bottom of the container, a lens support material for supporting the lens, the lens support material being put so as to slide on the side surface of the container, a connecting material for connecting between the container and the lens support material over circumferences of both side surfaces thereof, a fluid which is filled in a space formed by the container and the lens support material, and control means for controlling a volume of the fluid in the space, wherein a position of the lens with respect to the light receiving portion is controlled by controlling the volume of the fluid.

According to the present invention, the lens support material for supporting the lens is put so as to slide on the side surface of the cylindrical container in which the image sensor having the light receiving portion is arranged at the bottom, and the container and the lens support material are connected by the connecting material over the circumferences of the side surfaces thereof. The fluid is then filled in the space which is formed by the container and the lens support material, and the position of the lens support material with respect to the container is moved by controlling the volume of the fluid in the space, so that the position of the lens with respect to the light receiving portion is controlled. As described above, since the position of the lens with respect to the light receiving portion can be controlled by the volume of the fluid in one space formed by the container and the lens support material, the control is extremely simple and a reduction in size can be easily achieved. Moreover, since movement of the lens is smooth and quiet because of using the fluid, when, for example, a microphone for collecting a voice is provided in the neighborhood, a noise during the lens movement may not be collected by the microphone, so that it is applicable to various applications.

The imaging module in accordance with the present invention is configured in such a way that the connecting material thereof has elasticity, and can vary the volume of the fluid in the space by expanding and contracting.

According to the present invention, the volume of the fluid in the space can be varied by the expansion and contraction of the connecting material. As a result of this, when the fluid flows into the space, the connecting material expands, so that the volume of the fluid filled in the space is increased, namely, the volume of the space is increased. Consequently, the distance of the lens support material (lens) with respect to the light receiving portion can be made longer than a reference value. Meanwhile, when the fluid flows out of the space, the connecting material contracts and further expands to a reverse direction, so that the volume of the fluid filled in the space is decreased, namely, the volume of the space is decreased. Consequently, the distance of the lens support material (lens) with respect to the light receiving portion can be made shorter than the reference value.

The imaging module in accordance with the present invention is provided with a position regulating section for regulating a moving range of the lens in the optical axis direction.

According to the present invention, since the moving range of the lens is limited by including the position regulating section for regulating the moving range of the lens in the optical axis direction, even when a connecting material having elasticity is used, an elastic range of the connecting material is limited, so that the breaking can be prevented. As a result, it is possible to prevent a leak of the fluid to the outside resulted from the breaking of the connecting material.

In the imaging module in accordance with the present invention, the fluid is a liquid or a gas excellent in light transmittance.

According to the present invention, an insulating liquid like deionized water, or gas like atmospheric air, excelled in light transmittance is filled in the space formed by the container and the lens support material. As the fluid, it is preferred that a refractive index may be almost the same, and high molecular polymers for absorbing light in the infrared region may be mixed.

The imaging module in accordance with the present invention is configured in such a way that the container is provided with a plurality of openings for allowing the fluid to flow in and/or out of the space, wherein the volume of the fluid in the space is controlled through the openings.

According to the present invention, the plurality of openings for allowing the fluid to flow in and/or or out of the space are provided in the container, so that the volume of the fluid in the space is controlled through the openings. In other words, since the volume of the fluid is determined by the amount of fluid flowing in and out of the plurality of openings, it is possible to easily control the volume of the fluid in the space by controlling the amount of the fluid flowing in and out of each opening.

The imaging module in accordance with the present invention is provided with compressing and decompressing means, connected to the openings, for compressing and decompressing the fluid, wherein the fluid is circulated by compressing and decompressing the fluid.

According to the present invention, the compressing and decompressing means is connected to the openings, and the fluid is circulated by compressing and decompressing the fluid. It is possible to control the fluid flowing in and out of each opening by compressing and decompressing the fluid with the compressing and decompressing means. The amount of fluid flowing in and out of each opening is controlled with a simple configuration using, as the compressing and decompressing means, an inexpensive commercial product generally called an actuator, and it is possible to control the position of the lens with respect to the light receiving portion.

The imaging module in accordance with the present invention is provided with a check valve for regulating a direction of the fluid flowing in and out of the space through the openings.

According to the present invention, the direction of the fluid flowing in and out of the space through the openings is regulated by the check valve. When the direction of the fluid flowing in and out of the space is irregular, there is a possibility that an irregular external force may act to the container and the lens support material by the flow velocity, and a stress may be transmitted to the connecting material, but the stress transmitted to the connecting material is controlled by giving regulation to the direction of the fluid flowing in and out of the space, thus making it possible to suppress the breaking of the connecting material.

The imaging module in accordance with the present invention is provided with a filter for removing an unnecessary substance existing in the space.

According to the present invention, it is possible to prevent foreign materials, such as a dust, from flowing into the space again by removing the unnecessary substance existing in the space with the filter. For example, even if a dust, such as a foreign particle, a chip, or the like, may be left in the space in the manufacturing process of the imaging module, the dust left in the space can be removed by using the imaging module, resulting in high efficiency.

The imaging module in accordance with the present invention keeps a temperature inside the imaging module constant by the fluid flowing in and out of the space.

According to the present invention, the fluid is circulated by the fluid flowing in and out of the space, so that the temperature inside the module can be kept constant.

The imaging module in accordance with the present invention controls the position of the lens to thereby adjust the focal point and/or the magnification.

According to the present invention, the position of the lens is controlled to adjust the focal point and/or or the magnification, thus making it possible to provide the imaging module having an extremely simple and compact focal point adjustment function and/or magnification adjustment function. Even when a plurality of lenses are combined and the position of each lens is controlled, the mechanism of the imaging module is simple, thus, allowing it to be used for various applications while preventing the weight from being increased.

The above and further objects and features of the invention will more fully be apparent from the following detailed description with accompanying drawings.

BRIEF DESCRIPTION OF THE SEVERAL VIEWS OF THE DRAWINGS

FIG. 9 is a structural sectional view showing a structure of the imaging module in accordance with the second embodiment of the present invention;

DETAILED DESCRIPTION OF THE PRESENT INVENTION

Hereinafter, the present invention will be described in full detail based on the drawings representing embodiments.

FIRST EMBODIMENT

Figure 1:
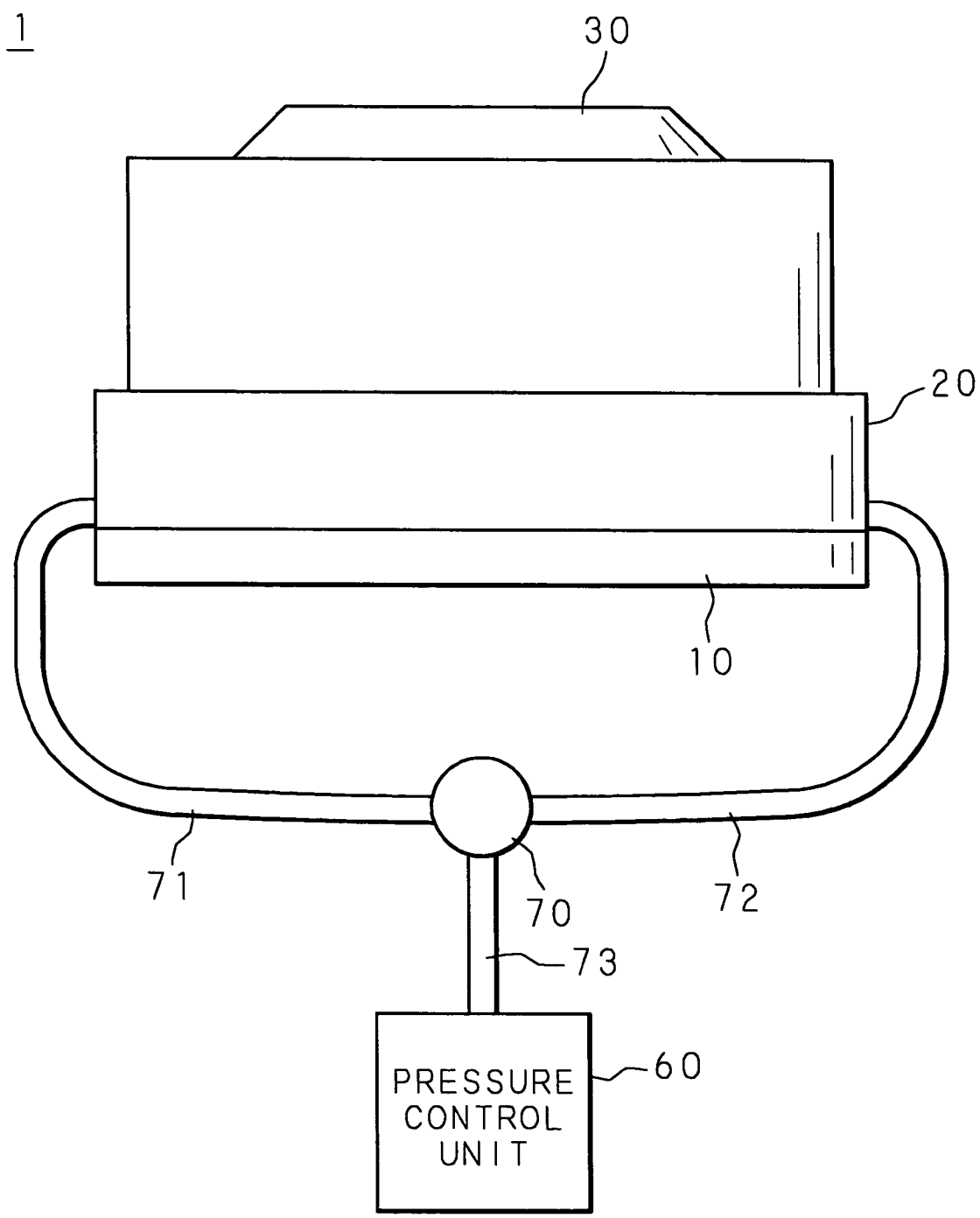
FIG. 1 is a schematic diagram showing a configuration of an imaging module in accordance with a first embodiment of the present invention.

FIG. 1 is a schematic diagram showing a configuration of an imaging module in accordance with a first embodiment of the present invention, wherein the imaging module has a function as a lens-position controller for controlling a position of a lens in an optical axis direction. Hereinafter, the imaging module will be described in details, while the description of the lens-position controller will be omitted.

An imaging module 1 in accordance with the first embodiment of the present invention is provided with a cylindrical lens barrel 20 arranged on a substrate 10 in which an image sensor is formed, and a lens holder 30 for supporting a lens, the lens holder 30 being put so as to slide on the inner surface of a side portion of the lens barrel 20. While details will be described later, the substrate 10 and the lens barrel 20 serves as a container for containing a fluid.

The lens barrel 20 is provided with two openings, to which conduit pipes 71 and 72 used as a path of the fluid, such as a gas or a liquid, are connected. The conduit pipes 71 and 72 are connected to a fluid reservoir 70, and the fluid reservoir 70 is connected to a pressure control unit 60 for compressing and decompressing the fluid via a conduit pipe 73 different from the conduit pipes 71 and 72. It should be noted herein that a flexible board, a connector, and the like, which are electrically connected to an electrical instrument incorporating the imaging module, are omitted for the purpose of simplifying the description.

The pressure control unit 60 is generally called an actuator, and as the actuator, there is known, for example, a system for compressing and decompressing a fluid by rotation of a motor or the like using a piston and a cylinder (an air cylinder, an oil hydraulic cylinder); and a system for compressing and decompressing a fluid using a piezo (piezo-electricity) component which exhibits a mechanical strain by applying an electrical voltage, or the like.

Figure 2:
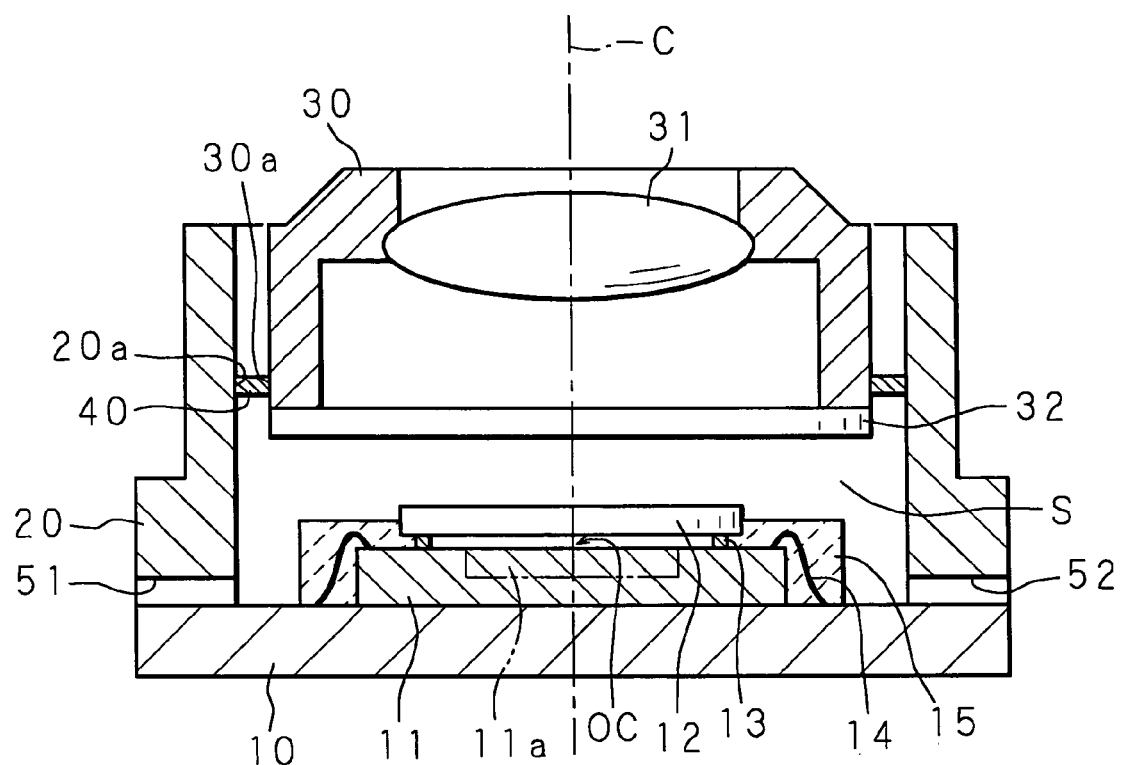
FIG. 2 is a structural sectional view showing a structure of the imaging module in accordance with the first embodiment of the present invention.
Figure 3:
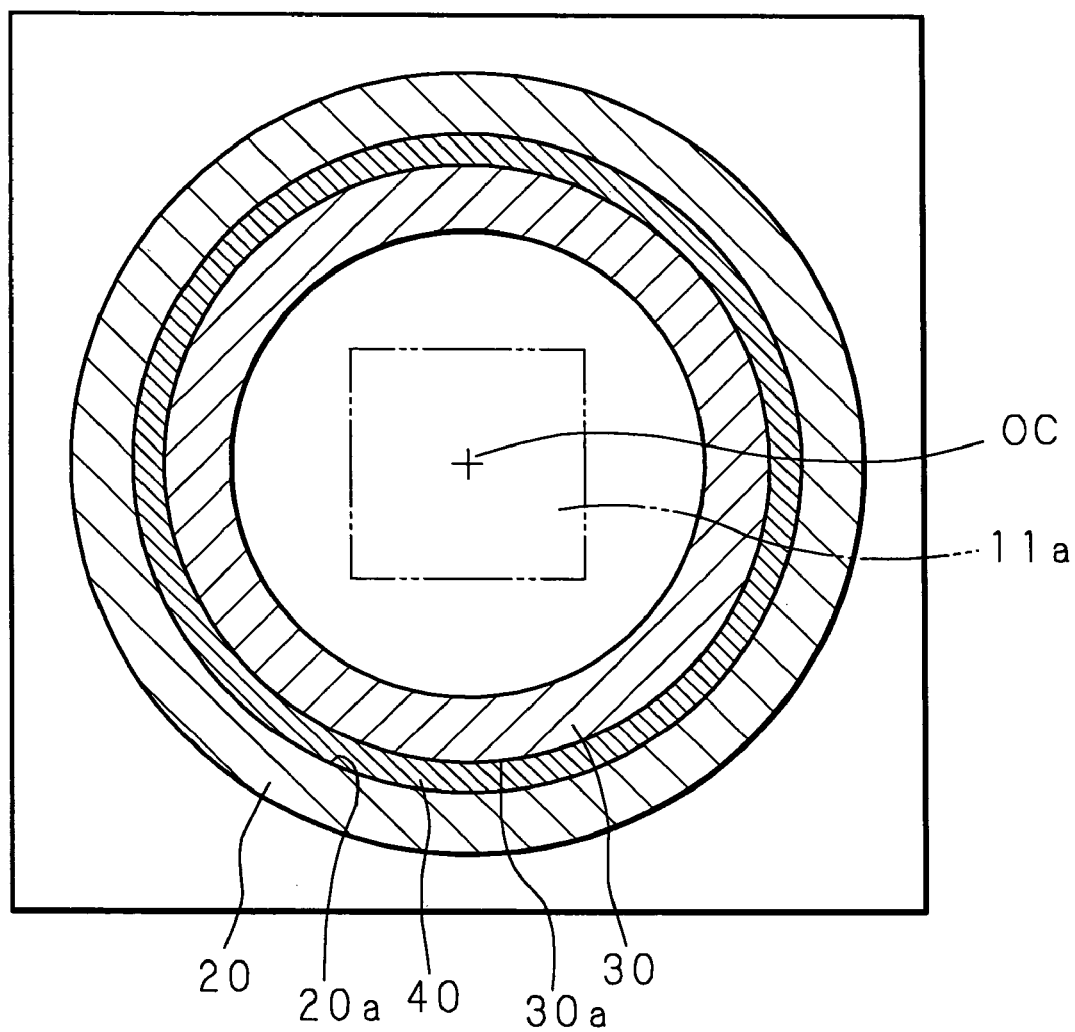
FIG. 3 is a plan view where the imaging module in accordance with the first embodiment of the present invention is viewed from a light incidence side.

FIG. 2 is a structural sectional view showing a structure of the imaging module in accordance with the first embodiment of the present invention, while FIG. 3 is a plan view where the imaging module in accordance with the first embodiment of the present invention is viewed from a light incidence side. It should be noted herein that FIG. 3 is shown by omitting some components for the purpose of facilitating the understanding of the positional relationships among the image sensor (light receiving portion), the lens holder (lens support material), and the substrate and the lens barrel (container), which are characterized in the present invention.

The substrate 10 is, for example, a multilayer interconnection substrate, and on a surface of the substrate 10, a predetermined interconnection is made, and an image sensor 11, such as a CCD, a CMOS imager, or the like, which is a kind of a semiconductor device, is dice-bonded. The image sensor 11 is provided with a light receiving portion 11a in the center of a chip, and is configured in such a way that a peripheral circuit, such as a read-out circuit for reading a signal based on a quantity of light detected by the light receiving portion 11a, is provided in the periphery of the chip. Such the image sensor 11 itself is manufactured by, for example, stacking a plurality of layers on a semiconductor wafer using a well-known semiconductor manufacturing technology.

A transparent plate 12 composed of a material, such as a light-permeable glass, a light-permeable resin, or the like, whose board thickness and surface profile irregularity are highly precisely processed, is fixed to the image sensor 11 in a state of keeping a predetermined gap with respect to the surface of the image sensor 11 via a bonding portion 13. Since the transparent plate 12 covers at least the light receiving portion 11a, the light receiving portion 11a (a surface thereof can be protected from external moisture, dusts (foreign particles, chips), or the like.

The periphery of the image sensor 11 is an exposed area which is not covered with the transparent plate 12, and a bonding pad, which is not shown, is formed thereon and connected to the substrate 10 via a bonding wire 14. The bonding wire 14 is molded with a resin 15 so as not only to prevent the wire from peeling, but also to endure external impact. The resin 15 is intended to protect the bonding wire 14 or the like from the fluid to be filled, and may be suitably selected depending on the type of the fluid.

A semiconductor device (not shown), such as a DSP or the like, which supplies a control signal to the image sensor 11 or processes an output signal from the image sensor 11, is suitably provided in an image sensor mounting surface or the other surface of the substrate 10, and is connected to an external circuit outside the module via a terminal provided in a side, a back, or the like of the substrate 10. Incidentally, a conductor penetrating the semiconductor chip which is the image sensor 11 may be provided in the other surface instead of the bonding pad to thereby directly bond the conductor to the interconnection formed on the surface of the substrate 10.

Moreover, the module has a structure where the cylindrical lens barrel 20 is arranged in the periphery of the substrate 10, and the image sensor 11 is arranged at the bottom side of the lens barrel 20. Meanwhile, two openings 51 and 52 are provided in the lens barrel 20, and are connected to the aforementioned conduit pipes 71 and 72, respectively. Further, the lens holder 30 which slides along the inner surface of the side portion of the lens barrel 20 is put in the lens barrel 20. A lens 31 which guides a path of an incident light to the light receiving portion 11a of the image sensor 11 is fixed to a predetermined position (upper part) of the lens holder 30. Meanwhile, a lid glass 32 which also serves as a low pass filter is fixed to a predetermined position (lower part) of the lens holder 30. It should be noted herein that a position of each component is adjusted so that a centerline C of the lens 31 provided in the lens holder 30 may be aligned with an optical center OC of the light receiving portion 11a. Additionally, note herein that while a case where the lens 31 of one is used is described in the present embodiment, a plurality of lenses may be combinedly used if needed, and the number of lenses is not limited.

Moreover, in the present embodiment, an inner surface 20a of the side portion of the lens barrel 20 and an outer surface 30a of the side portion of the lens holder 30 are connected together in a circumferential shape by a connecting material 40, and a space S formed by a container composed of the substrate 10 and the lens barrel 20, and the lens holder 30 is filled with a fluid, such as a gas like atmospheric air, and an insulating liquid like deionized water. Although high molecular polymers for absorbing light in the infrared region may be mixed as the fluid, it is preferable that refractive indexes thereof are almost the same.

The connecting material 40 is made of a material, such as a rubber, a plastic, or the like, which can vary a volume of the space S by expanding and contracting. Moreover, since the connecting material 40 connects between the inner surface 20a of the side portion of the lens barrel 20 and the outer surface 30a of the side portion of the lens holder 30 over the circumference, the connecting material 40 prevents the fluid filled in the space S from leaking to the outside through a gap between the lens barrel 20 and the lens holder 30.

Depending on the volume of the fluid flowing in and flowing out through the two openings 51 and 52 provided in the lens barrel 20, the connecting material 40 expands and contracts to thereby adjust the volume of the space S. Since the relationship between the volume of the space S, and the position of the lens 31 that is provided in the lens holder 30 with respect to the image sensor 11 (light receiving portion 11a) has one-to-one correspondence, adjusting the volume of the space S makes it possible to control the position of the lens 31. In other words, a distance of the lens 31 with respect to the image sensor 11 (light receiving portion 11a) in the optical axis direction C is controllable.

Figure 4:
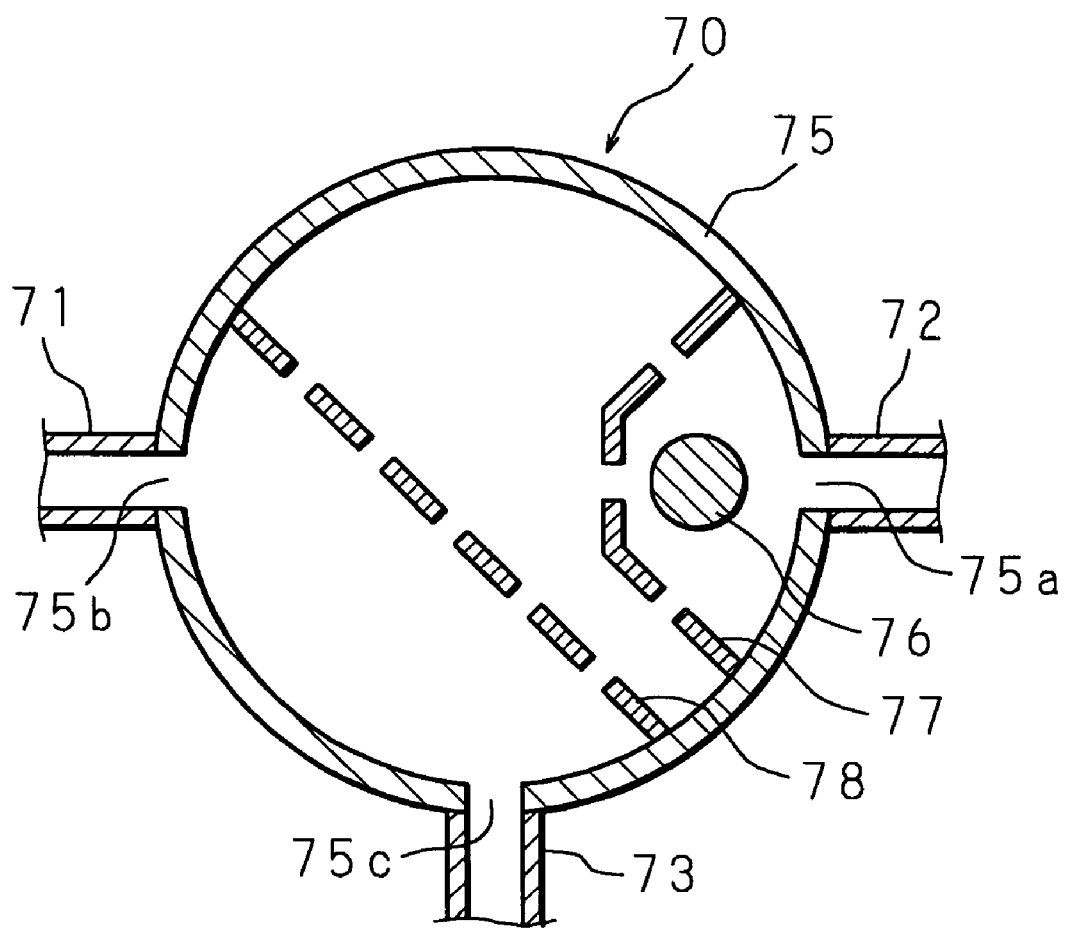
FIG. 4 is a structural sectional view showing a structure of a fluid reservoir.

FIG. 4 is a structural sectional view showing a structure of a fluid reservoir. The fluid reservoir 70 is composed of a housing 75, which has a spherical external shape (the shape is not limited) and has three holes (first hole 75a, second hole 75b, third hole 75c), and a mesh 77 is arranged thereinside so as to surround the first hole 75a (connected to the conduit pipe 72), and a ball 76 is arranged in a space of the mesh 77 on a side of the first hole 75a. Meanwhile, the conduit pipes 71 and 73 are connected to the remaining second hole 75b and third hole 75c, respectively.

The ball 76 and the mesh 77 serve as a check valve for jointly determining a flowing direction of the fluid. In other words, when the fluid flows from the pressure control unit 60 through the conduit pipe 73 into the fluid reservoir 70 (housing 75), the ball 76 will move to the first hole 75a side by the pressure of the fluid to thereby block the first hole 75a, so that the fluid will flow into the conduit pipe 71 from the conduit pipe 73. As a result, the fluid will flow from the fluid reservoir 70 through the conduit pipe 71 into the space S (refer to FIG.

2), and will further flow from the space S through the conduit pipe 72 into the fluid reservoir 70, thus, allowing the fluid to be circulated in a predetermined direction. In addition, the fluid absorbs heat produced by the operation of the imaging module or the like, thus, allowing the temperature inside the imaging module to be kept constant.

Preferably, it is configured in such a way that a mesh filter 78 is provided inside the housing 75 to thereby prevent a dust contained in the fluid from flowing into the space S from the conduit pipe 71 again. As a result of this, even if a dust, such as a foreign particle, a chip, or the like, may be left in the space S in the manufacturing process of the imaging module, the dust left in the space S can be moved, by using the imaging module, from the space S through the conduit pipe 72 to the fluid reservoir 70 with the pressure of the fluid, thus allowing the space S to be cleaned. Although the dust left in the space S has a possibility of being received by the image sensor 11 as a noise, providing the mesh filter 78 can suppress the noise generation. As a matter of course, preferably, a mesh size of the mesh filter 78 may be suitably determined according to an application purpose of the imaging module.

Figure 5A:
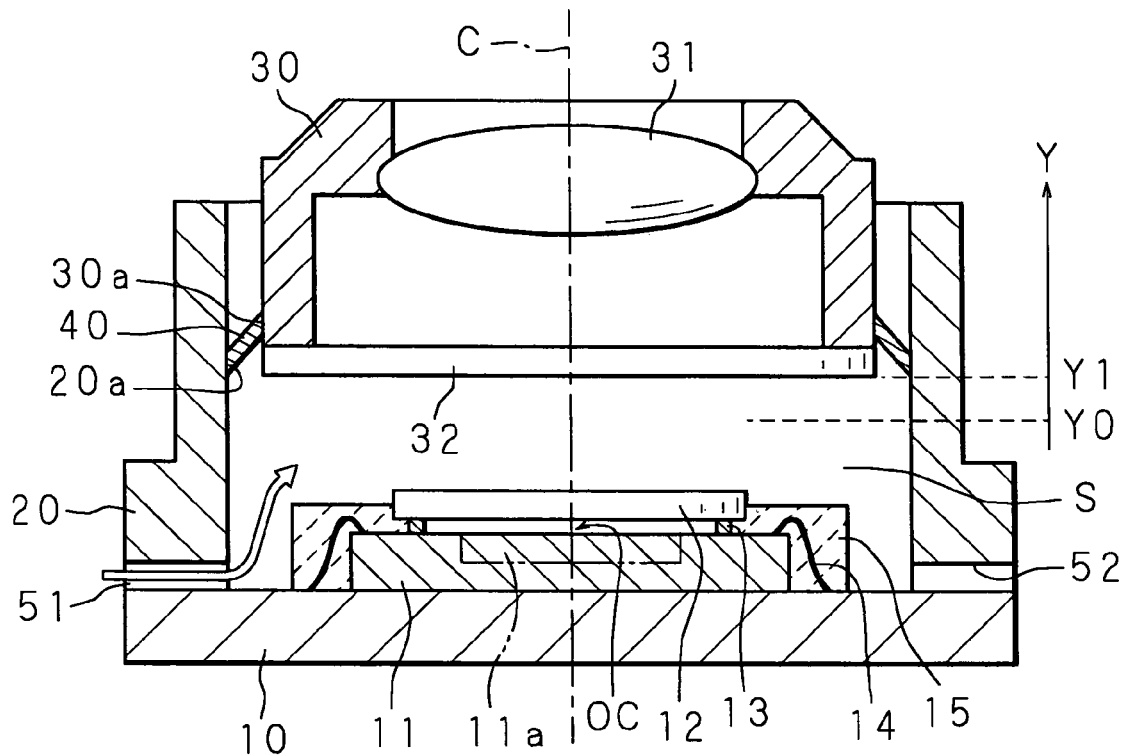
FIGS. 5A and 5B are explanatory diagrams for explaining a position state of a lens.
Figure 5B:
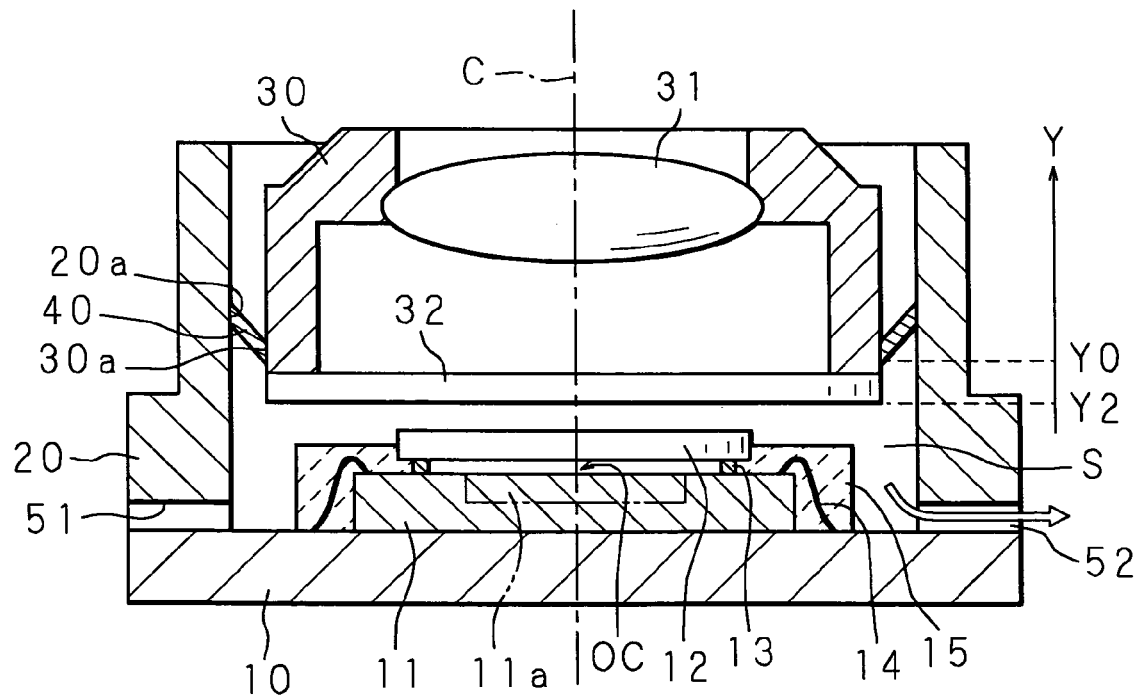

FIGS. 5A and 5B are explanatory diagrams for explaining a position state of the lens. When the fluid is compressed by the pressure control unit 60, the fluid flows from the pressure control unit 60 into the fluid reservoir 70, and further flows from the opening 51 through the conduit pipe 71 into the space S (FIG. 5A). The connecting material 40 then expands, so that a volume of the fluid to be filled in the space S is increased, namely, the volume of the space S is increased. As a result, a distance of the lens holder 30, namely the lens 31, with respect to the light receiving portion 11a results in Y1 from a reference value Y0 (Y1>Y0). In other words, the lens 31 can be moved away from the light receiving portion 11a along the optical axis direction, thereby making it possible to lengthen the focal distance.

Meanwhile, when the fluid is decompressed by the pressure control unit 60, the fluid flows from the space S through the opening 52 and the conduit pipe 72 into the fluid reservoir 70, and further flows into the pressure control unit 60 through the conduit pipe 73 (FIG. 5B). The connecting material 40 then expands to a reverse direction to the aforementioned direction, so that the volume of the fluid to be filled in the space S is decreased, namely, the volume of the space S is decreased. As a result, the distance of the lens holder 30, namely, the lens 31, with respect to the light receiving portion 11a results in Y2 from the reference value Y0 (Y2<Y0). In other words, the lens 31 can be moved toward the light receiving portion 11a along the optical axis direction, thereby making it possible to shorten the focal distance. As described above, the pressure control unit 60 compresses and decompresses the fluid to thereby control the volume of the fluid in the space S which is formed by the lens barrel 20 and the lens holder 30, and controls the position of the lens 31 with respect to the light receiving portion 11a.

Incidentally, since the volumes of the space S, in the case of the imaging modules in which, for example, 350,000 pixels (equivalent to VGA) and one million pixels are incorporated in the image sensors, are about 0.38 cc and about 1.6 cc, respectively, the pressure control unit 60 may have a capability for compressing and decompressing the fluid of this amount of volume. Meanwhile, since elasticity of the connecting material 40 is determined depending on a setting range of the focal distance that is requested for application purposes for which the imaging module is used, it is preferable to suitably determine the material and the shape.

Figure 6:
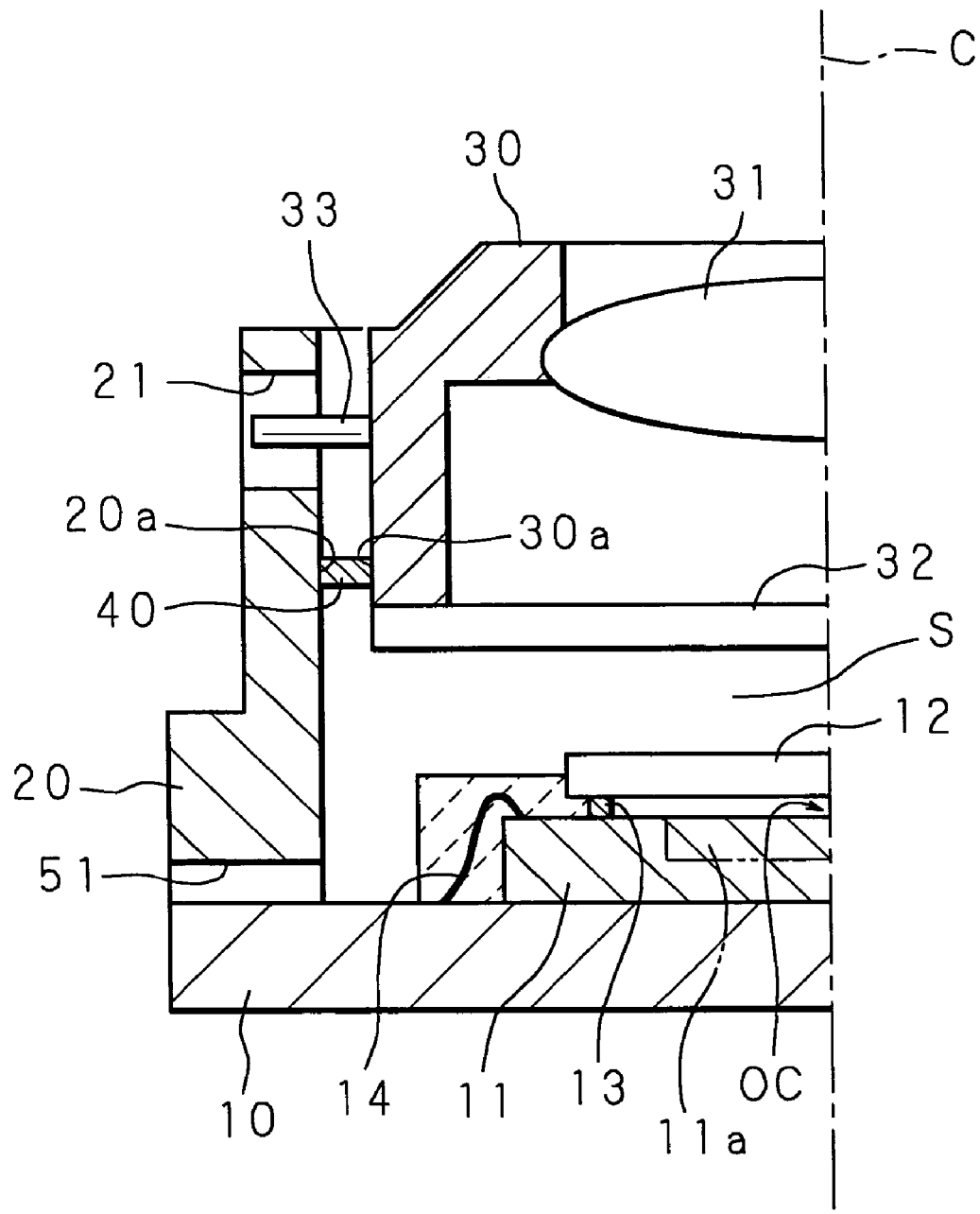
FIG. 6 is a structural sectional view showing a principal part of another structure of the imaging module in accordance with the first embodiment of the present invention.

Incidentally, since the connecting materials 40 is made of a material, such as a rubber, a plastics, or the like, which can vary the volume of the space S, when the volume of the space S is significantly out of the variable range, there is possibility that the connecting material 40 breaks and then generates a gap between the lens barrel 20 and the lens holder 30, so that the fluid leaks outside from the space S. For that reason, preferably, the variable range of the volume in the space S of the fluid is regulated, namely, a position regulating section for regulating a moving range of lens holder 30 (lens 31) in the optical axis direction is provided. For example, as shown in FIG. 6, a notch 33 is provided in an outer surface of side portion of the lens holder 30, and a regulation hole 21 for regulating a moving range of the notch 33 is further provided in the side portion of the lens barrel 20 corresponding to the notch 33. As a result of this, since movement of the notch 33 is limited only in an area of the regulation hole 21, a positional relationship between the lens barrel 20 and the lens holder 30, namely, a moving range of the lens 31 in the optical axis direction can be regulated corresponding thereto. Accordingly, an elastic range of the connecting material 40 is limited, so that the connecting material 40 can be prevented from breaking, thus making it possible to prevent the fluid from leaking outside.

Figure 7A:
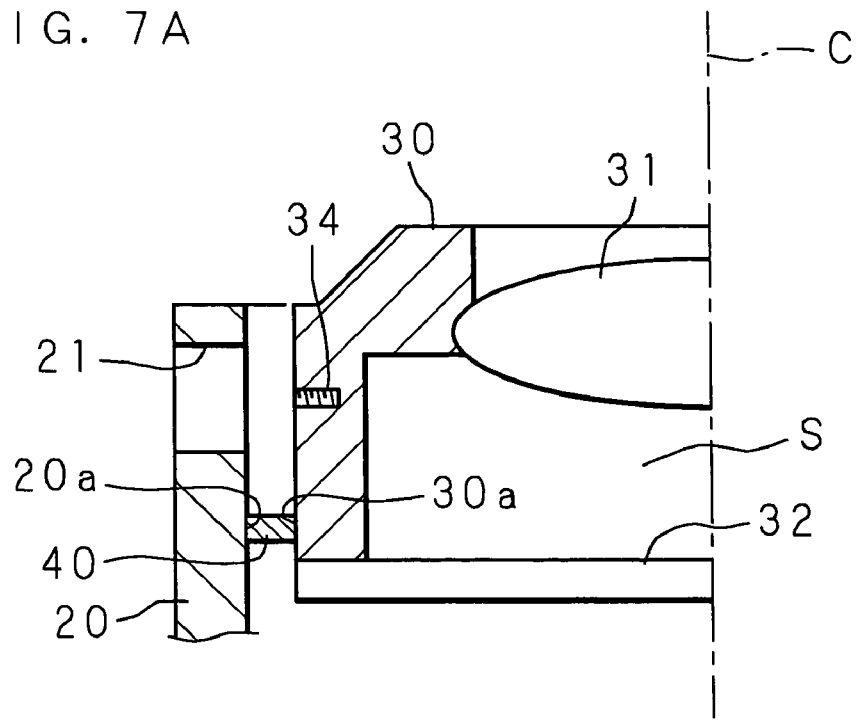
FIGS. 7A and 7B are explanatory diagrams for explaining a manufacturing method of the imaging module shown in FIG. 6.
Figure 7B:
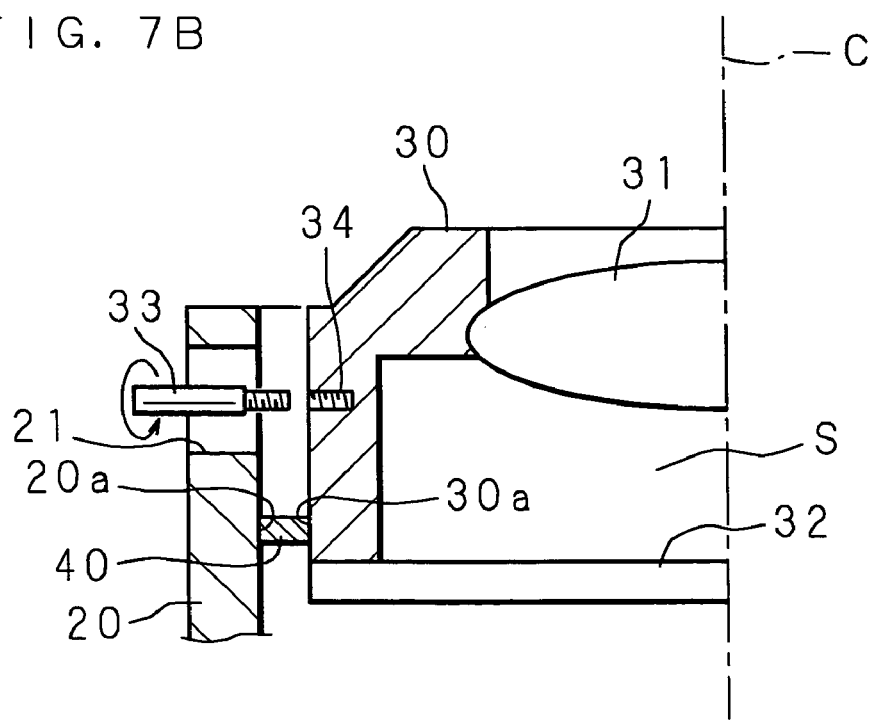

FIGS. 7A and 7B are explanatory diagrams for explaining a manufacturing method of the imaging module shown in FIG. 6. Note herein that, the description will be made, as an example, of a case where a screw-like notch is used. First, a screw hole 34 and the regulation hole 21 are provided in advance in a predetermined arranging position of the notch 33 of the outer surface of side portion of the lens holder 30, and the side portion of the lens barrel 20, respectively (FIG. 7A), the notch 33 is arranged in the lens holder 30 by screwing the notch 33 into the screw hole 34 from the regulation hole 21 (FIG. 7B). Incidentally, the moving range of the lens 31 in the optical axis direction, namely, a correlation between the screw hole 34 and the regulation hole 21 is determined depending on a specification of the imaging module, so that what is necessary is just to perform a treatment to the lens barrel 20 and the lens holder 30 in advance.

SECOND EMBODIMENT

In the first embodiment, while there is described a mode in which the lens holder for supporting the lens is put so as to slide on the inner surface of the side portion of the cylindrical lens barrel arranged on the substrate in which the image sensor is formed, the lens holder may be put so as to slide on the outer surface of the side portion of the lens barrel, a mode that is configured in this manner is a second embodiment.

Figure 8:
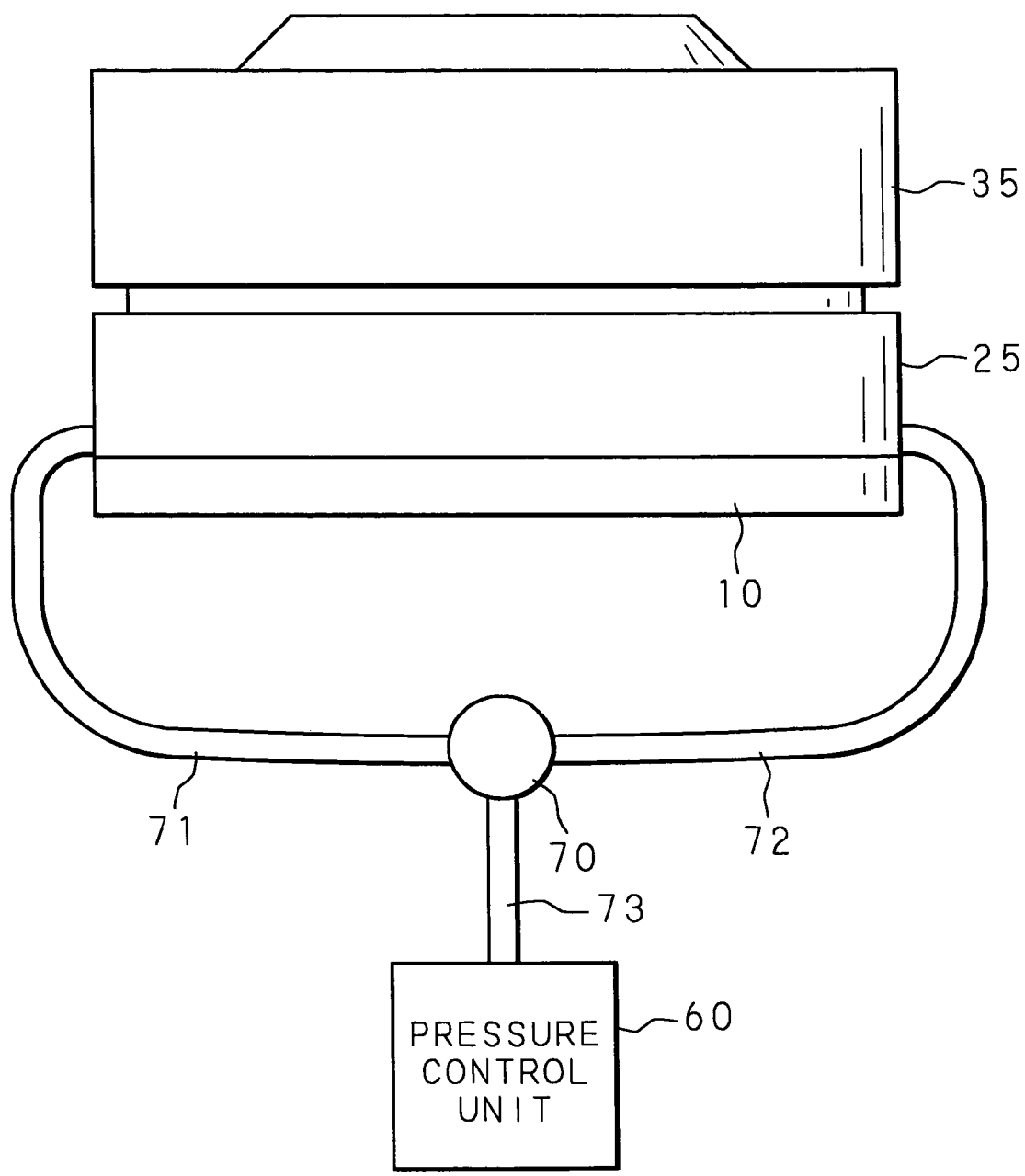
FIG. 8 is a schematic configuration showing a configuration of an imaging module in accordance with a second embodiment of the present invention.

FIG. 8 is a schematic diagram showing a configuration of an imaging module in accordance with the second embodiment of the present invention, whereas FIG. 9 is a structural sectional view showing a structure of the imaging module in accordance with the second embodiment of the present invention. An imaging module 2 in accordance with the second embodiment of the present invention is provided with a cylindrical lens barrel 25 arranged on the substrate 10 in which the image sensor is formed, and a lens holder 35 for supporting a lens, the lens holder 35 being put so as to slide on an outer surface of a side portion of the lens barrel 25. Additionally, similar to the first embodiment, an inner surface 25a of the side portion of the lens barrel 25 and an outer surface 35a of the side portion of the lens holder 35 are connected in a circumferential shape by the connecting material 40, and the space S formed by a container composed of the substrate 10 and the lens barrel 25, and the lens holder 35 is filled with a fluid, such as a gas like atmospheric air, and an insulating liquid like deionized water. Since other configurations are the same as those of the first embodiment, the same reference numeral is given to a corresponding component and the detailed description thereof will be omitted.

The connecting material 40 expands and contracts depending on the volume of the fluid flowing in and flowing out through the two openings 51 and 52 provided in the lens barrel 25, so that moving up and down of the lens holder 35 adjusts the volume of the space S. Since the relationship between the volume of the space S, and the position of the lens 31 that is provided in the lens holder 35 with respect to the image sensor 11 (light receiving portion 11a) has one-to-one correspondence, adjusting the volume of the space S makes it possible to control the position of the lens 31.

Figure 10A:
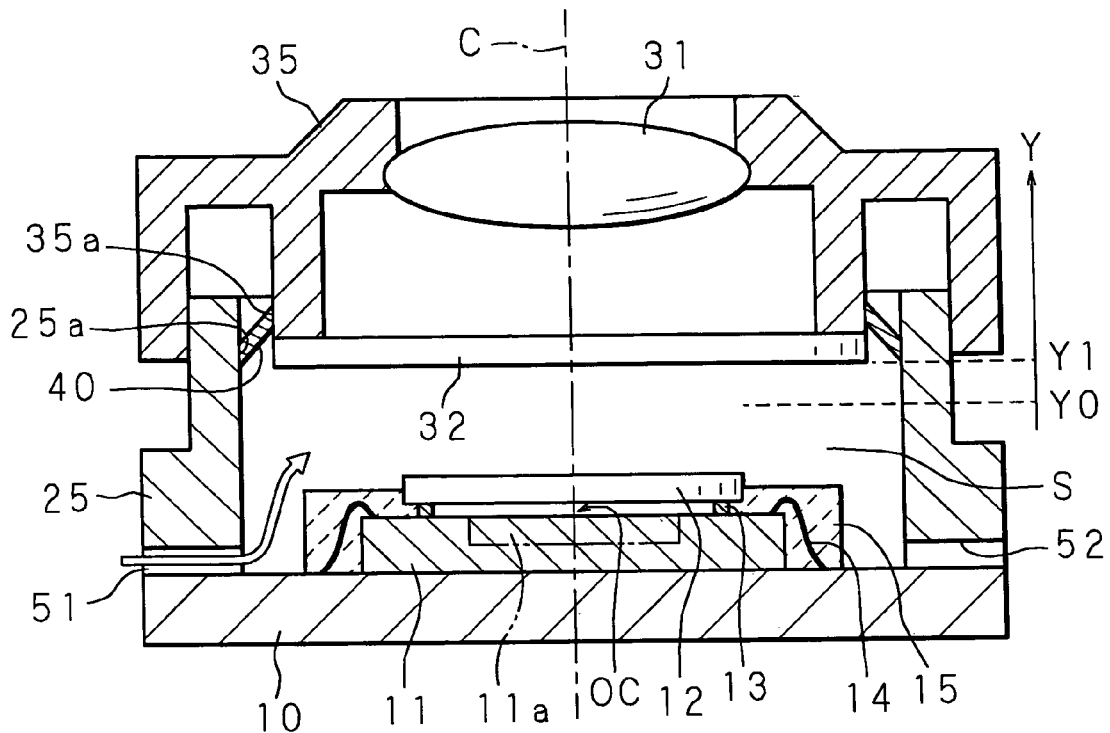
FIGS. 10A and 10B are explanatory diagrams for explaining a position state of a lens.
Figure 10B:
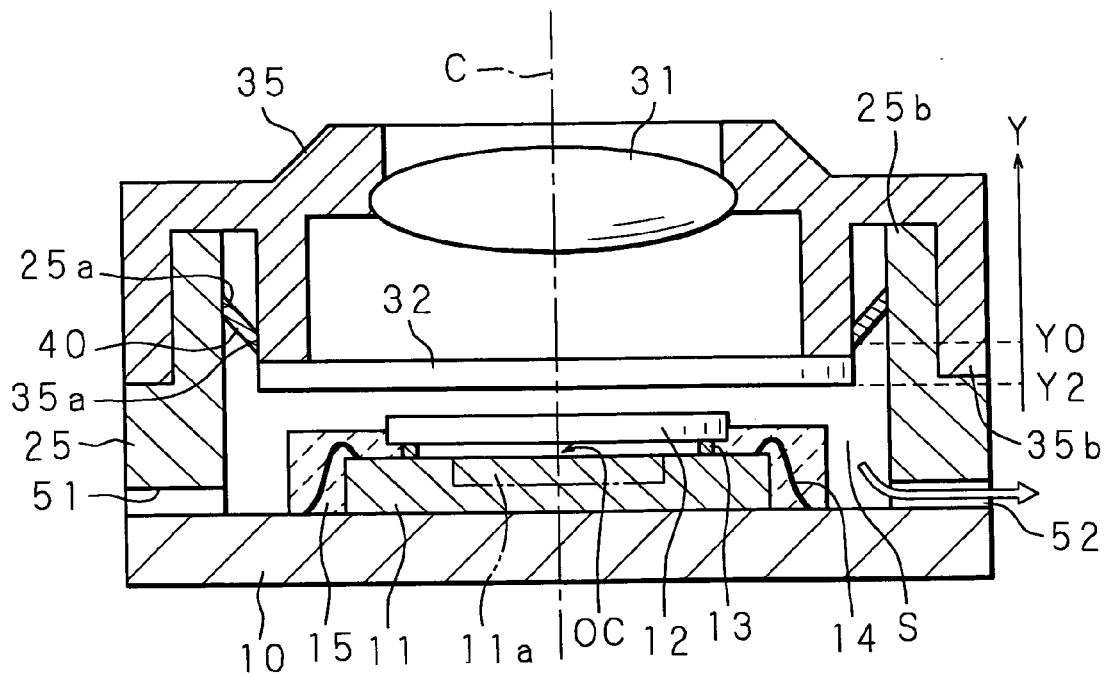

FIGS. 10A and 10B are explanatory diagrams for explaining a position state of the lens. When the fluid flows into the space S through the opening 51 (FIG. 10A), the connecting material 40 then expands, so that the volume of the fluid filled in the space S is increased, namely, the volume of the space S is increased. As a result, a distance of the lens holder 35, namely the lens 31, with respect to the light receiving portion 11a result in Y1 from the reference value Y0 (Y1>Y0). In other words, the lens 31 can be moved away from the light receiving portion 11a along the optical axis direction, thereby making it possible to lengthen the focal distance.

Meanwhile, when the fluid flows out of the space S to the outside through the opening 52 (FIG. 10B), the connecting material 40 expands to a reverse direction to the aforementioned direction, so that the volume of the fluid filled in the space S is decreased, namely, the volume of the space S is decreased. As a result, the distance of the lens holder 35, namely the lens 31, with respect to the light receiving portion 11a results in Y2 from the reference value Y0 (Y2<Y0). In other words, the lens 31 can be moved toward the light receiving portion 11a along the optical axis direction, thereby making it possible to shorten the focal distance. Moreover, since the movement thereof will be regulated by the presence of a side edge portion 25b of the lens barrel 25 and a side edge portion 35b of the lens holder 35, even when the connecting material 40 is broken, there in no possibility for the lid glass 32 provided in the lens holder 35 to come into contact with the image sensor 11 (more specifically with the transparent plate 12), thus preventing the image sensor 11 from being damaged.

Meanwhile, the inner surface 25a of the side portion of the lens barrel 25 and the outer surface 35a of the side portion of the lens holder 35 are preferably provided separately with a certain gap so that the connecting material 40 may be expanded and contracted, but there is a possibility that the optical axis may be displaced by the gap. Hence, in a manner similar to the imaging module 2, making a plane (sliding surface), on which the lens barrel 25 and the lens holder 35 slide, to be a plane different from the aforementioned plane (lens barrel 25: inner surface 25a of side portion, lens holder 35: outer surface 35a of side portion) can suppress the displacement between the lens barrel 25 and the lens holder 35 by the sliding surface to thereby suppress the displacement of optical axis.

Figure 11:
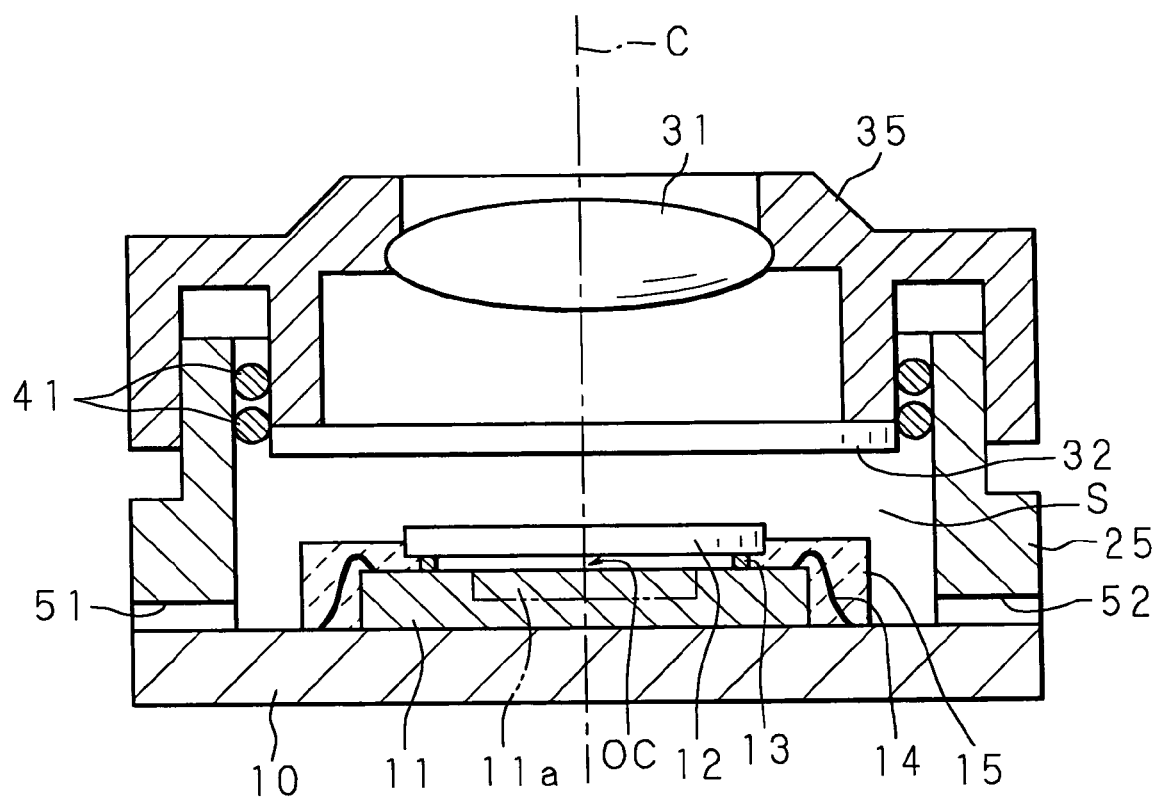
FIG. 11 is a structural sectional view showing a principal part of another structure of the imaging module in accordance with the present invention.

Incidentally, in the present embodiment, while there is described a case where the connecting material 40 is connected to each of the side surfaces of the lens barrel 25 (20) and the lens holder 35 (30) in a circumferential shape, it may be configured in such a way that one or a plurality of O-ring like connecting material (here, two connecting materials 41) may be arranged in the gap between the lens barrel 25 and the lens holder 35 as shown in FIG. 11, and the connecting material is not limited thereto as long as it can prevent the fluid filled in the space S from leaking outside through the gap between the lens barrel 25 and the lens holder 35, and vary the volume of the space S.

Figure 12:
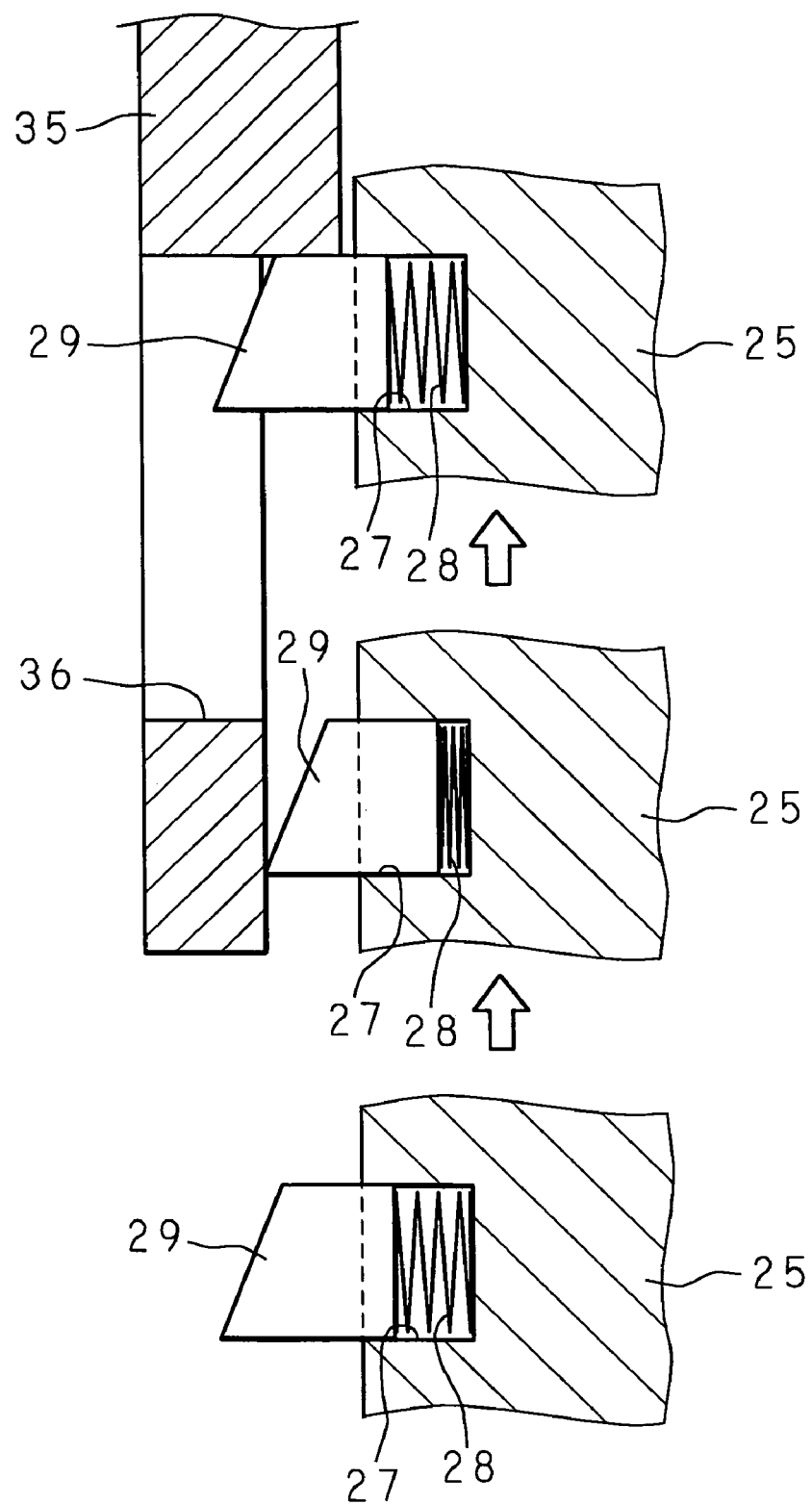
FIG. 12 is an explanatory diagram for explaining the principal part of other structures of a position regulating section.

Meanwhile, the position regulating section for regulating a moving range of the lens holder 35 (30) in the optical axis direction may be configured in such a manner that, as shown in FIG. 12, a side wall of the lens holder 35 is formed into a step shape, and a notch 29 which is fitted into a hole 27 provided in the lens barrel 25 (20) via a spring 28 is moved in a direction of an arrowhead in FIG. 12 to fit into a regulation hole 36 provided in the lens holder 35, so that a configuration of the position regulating section and an arrangement position thereof are not limited.

Figure 13:
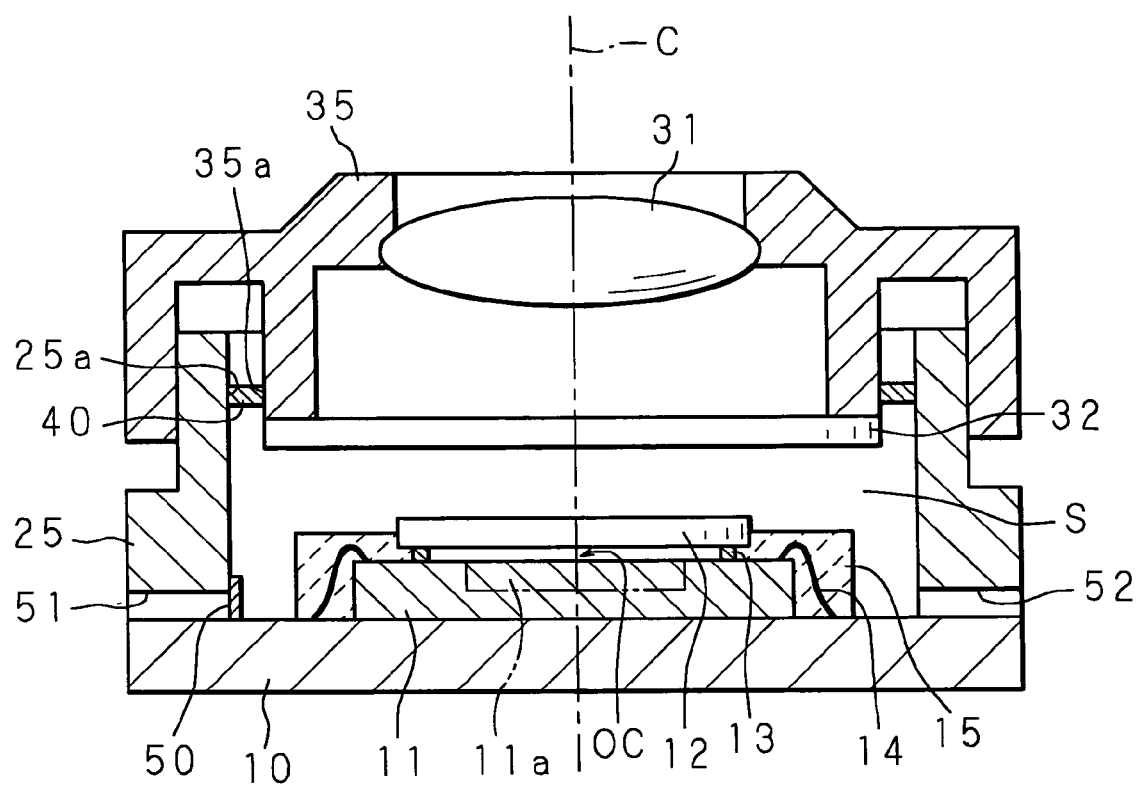
FIG. 13 is a structural sectional view showing another structure of the imaging module in accordance with the present invention.
Figure 14A:
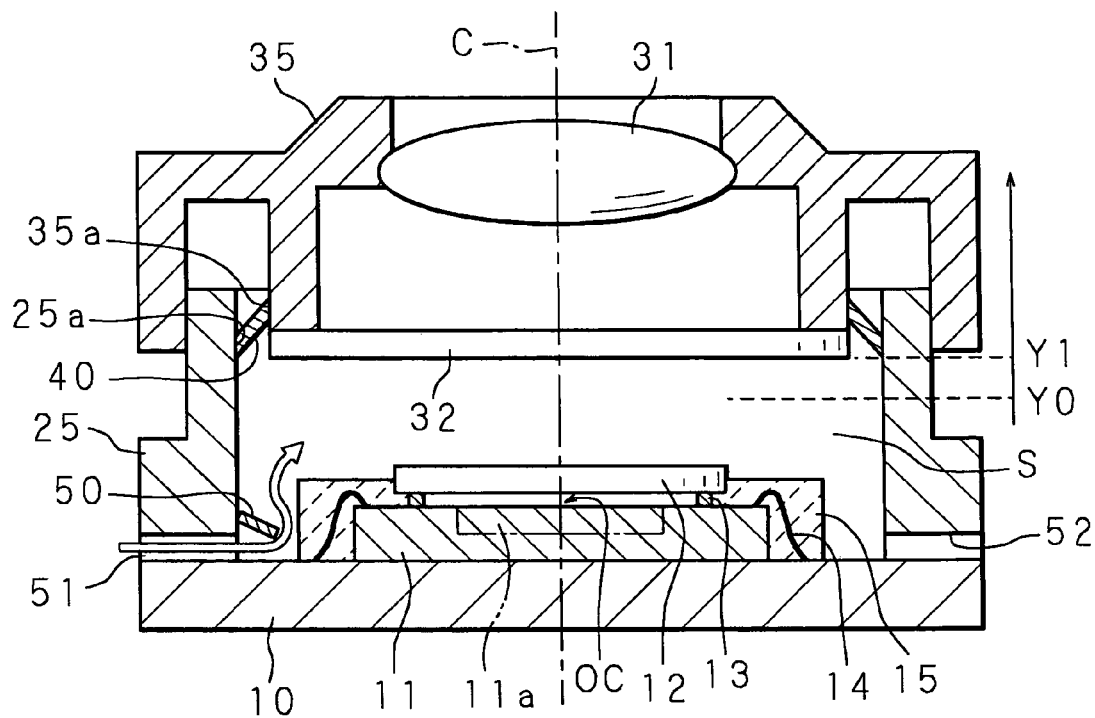
FIGS. 14A and 14B are explanatory diagrams for explaining a position state of a lens.
Figure 14B:
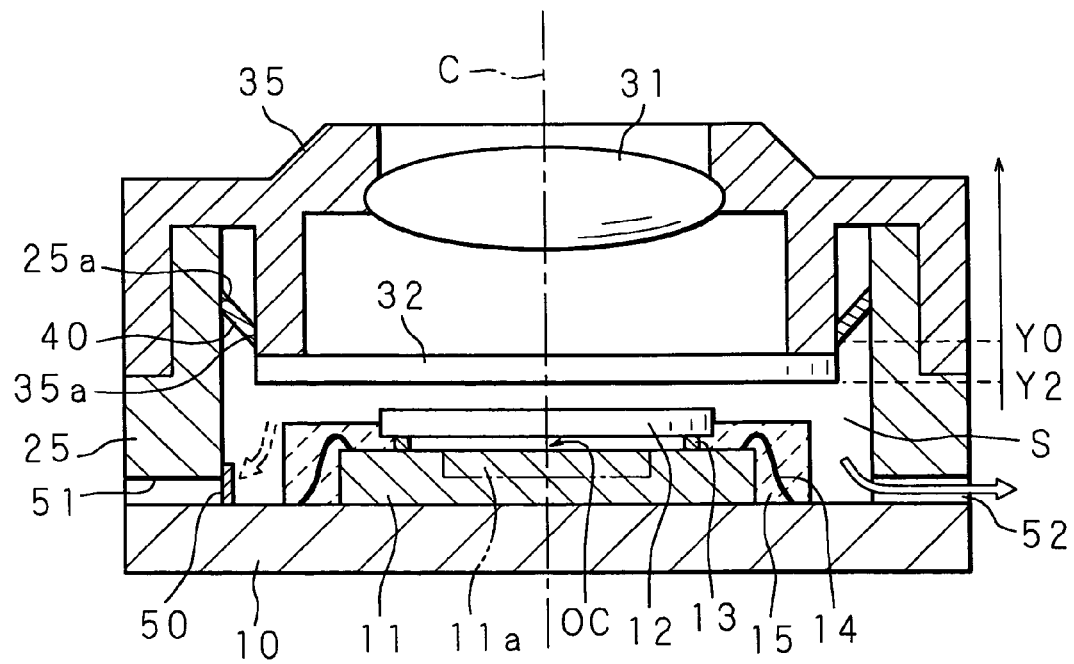

Moreover, in the present embodiment, while there is described a case where the ball 76 and the mesh 77 for serving as the check valve, which determine the flowing direction of the fluid, are provided in the fluid reservoir 70, a configuration of the check valve and an arrangement position thereof are not limited, so that a tabular check valve 50 may be arranged near the opening 51 as shown in, for example, FIG. 13, to thereby regulate a circulating direction of the fluid. When the check valve 50 is arranged near the opening 51 as shown in FIGS. 14A and 14B, if the fluid flows into the space S through the opening 51 (FIG. 14A), the check valve 50 leaps up with the pressure of the fluid and the fluid flows into the space S from the opening 51, whereas when the fluid flows out of the space S to the outside through the opening 52 (FIG. 14B), since the check valve 50 is closed, the fluid does not flow out of the space S to the opening 51 side, but will flow out of the opening 52 side.

Figure 15:
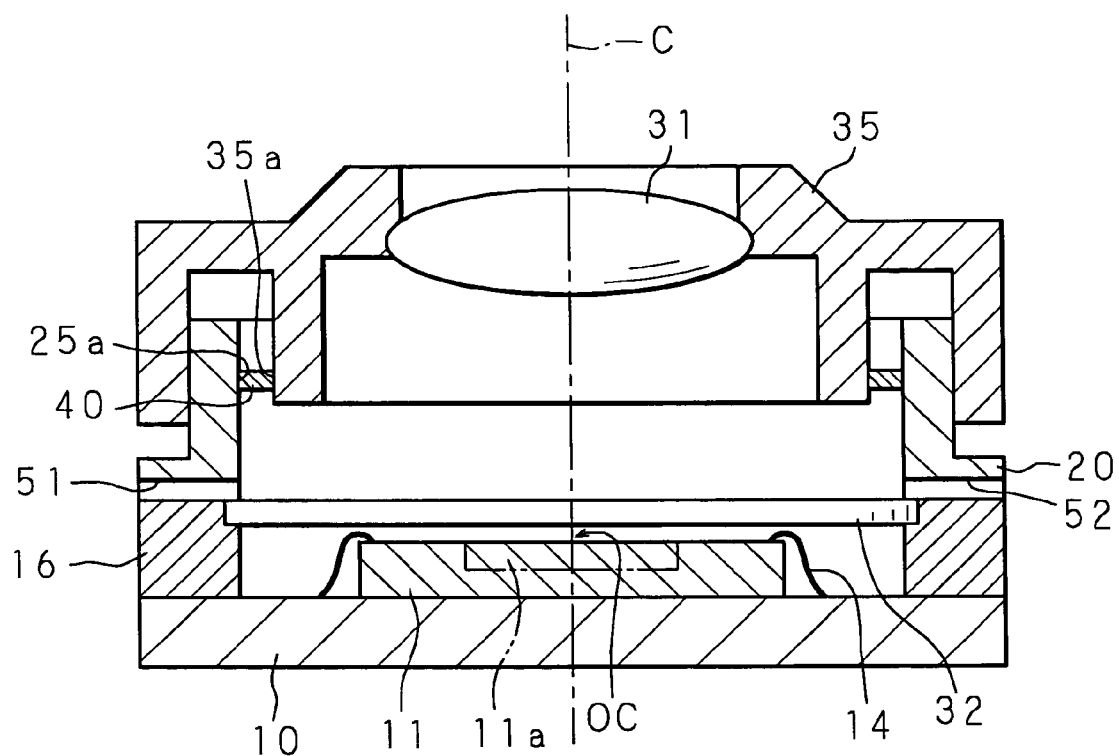
FIG. 15 is a structural sectional view showing another structure of the imaging module in accordance with the present invention.

Moreover, in the present embodiment, while there is described a case where the transparent plate 12 is arranged over the image sensor 11 via the bonding portion 13, and the lid glass 32 is arranged in the lens holder 35, a side wall 16 may be formed in the periphery of the substrate 10 and the lid glass 32 may be arranged in the side wall 16 as shown in FIG. 15, and it is not necessary herein to provide the transparent plate 12, the bonding portion 13, and the resin 15.

Further, an optical filter may be provided in the transparent plate 12 and the lid glass 32 according to optical characteristics (for example, a light transmittance property) of the fluid, and the characteristics may be intended to be relaxed.

As described above, while the concrete embodiments of the imaging module in accordance with the present invention are shown and described, the present invention is not limited thereto, but the lens-position controller, which is similarly configured, for controlling the position of the lens in the optical axis direction may be similarly considered. Those skilled in the art may apply, within the scope of the substance of the present invention, various modifications or improvements to the configurations and the features of the invention in accordance with the aforementioned embodiments.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An imaging module which is provided with an image sensor having a light receiving portion, and a lens, and guides a light entered into said lens to said light receiving portion, the imaging module comprising:

a container whose side surface is cylindrical in shape, said image sensor being arranged at the bottom of said container;

a lens support material for supporting said lens, the lens support material being put so as to slide on the side surface of said container;

a connecting material for connecting between said container and said lens support material over circumferences of both side surfaces;

a fluid which is filled in a space formed by said container and said lens support material; and a controller for controlling a volume of said fluid in said space, wherein a position of said lens with respect to said light receiving portion is controlled by controlling the volume of said fluid, and wherein said connecting material has elasticity, such that the volume of said space can be varied by an expansion or contraction of said connecting material in response to a change in quantity of said fluid in said space.

2. The imaging module according to claim 1, further comprising a position regulating section for regulating a moving range of said lens in an optical axis direction.

3. The imaging module according to claim 1, wherein said fluid is a liquid or a gas excellent in light transmittance.

4. The imaging module according to claim 1, wherein said container is provided with a plurality of openings for allowing said fluid to flow in and/or out of said space, and the volume of said fluid in said space is controlled through said openings.

5. The imaging module according to claim 4, further comprising a compressing and decompressing section which is connected to said openings, and compresses and decompresses said fluid, wherein said fluid is circulated by compressing and decompressing said fluid.

6. The imaging module according to claim 4, further comprising a check valve for regulating a direction of said fluid flowing in and out of said space through said openings.

7. The imaging module according to claim 1, further comprising a filter for removing an unnecessary substance existing in said space.

8. The imaging module according to claim 1, wherein a temperature inside the imaging module is kept constant by said fluid flowing in and out of said space.

9. The imaging module according to claim 1, wherein a focal point and/or a magnification thereof are adjusted by controlling the position of said lens.

* * * * *